United States Patent
Carew

(10) Patent No.: US 10,583,396 B1
(45) Date of Patent: Mar. 10, 2020

(54) APPARATUS AND METHOD TO EXTRACT PURIFIED WATER FROM SALINE AND OTHER FLUIDS

(71) Applicant: E. Bayne Carew, Naples, FL (US)

(72) Inventor: E. Bayne Carew, Naples, FL (US)

(*) Notice: Subject to any disclaimer, the term of this patent is extended or adjusted under 35 U.S.C. 154(b) by 0 days.

(21) Appl. No.: 16/548,457

(22) Filed: Aug. 22, 2019

Related U.S. Application Data

(60) Provisional application No. 62/798,723, filed on Jan. 30, 2019, provisional application No. 62/793,043, filed on Jan. 16, 2019, provisional application No. 62/785,405, filed on Dec. 27, 2018.

(51) Int. Cl.
| | | |
|---|---|---|
| *B01D 61/02* | (2006.01) | |
| *B01D 61/08* | (2006.01) | |
| *B01D 65/02* | (2006.01) | |
| *B01D 63/06* | (2006.01) | |
| *C02F 1/28* | (2006.01) | |
| *C02F 103/00* | (2006.01) | |
| *C02F 103/08* | (2006.01) | |

(52) U.S. Cl.
CPC ........... *B01D 61/027* (2013.01); *B01D 61/08* (2013.01); *B01D 63/06* (2013.01); *B01D 65/02* (2013.01); *C02F 1/281* (2013.01); *C02F 1/288* (2013.01); *B01D 2311/2626* (2013.01); *B01D 2321/04* (2013.01); *B01D 2325/02* (2013.01); *C02F 2103/003* (2013.01); *C02F 2103/08* (2013.01)

(58) Field of Classification Search
None
See application file for complete search history.

(56) References Cited

U.S. PATENT DOCUMENTS

| | | | | |
|---|---|---|---|---|
| 4,783,259 A | * | 11/1988 | Wade ..................... | B01D 35/10 210/167.12 |
| 4,804,481 A | * | 2/1989 | Lennartz ................ | B01D 29/33 210/791 |
| 5,198,107 A | * | 3/1993 | Ponce .................... | B01D 29/21 210/232 |
| 7,287,684 B2 | * | 10/2007 | Blackburne, Jr. ..... | B01D 29/111 228/130 |
| 2002/0020663 A1 | * | 2/2002 | Carew .................. | A01K 63/045 210/493.4 |
| 2012/0301800 A1 | * | 11/2012 | Carew .................. | A01K 63/045 429/416 |

(Continued)

*Primary Examiner* — Krishnan S Menon
(74) *Attorney, Agent, or Firm* — Miller Canfield

(57) ABSTRACT

A filter assembly for removing a solute from a solvent includes a first annular filter element and a second annular filter element disposed radially inwardly and concentrically aligned with the first filter element together defining a common axis. The first annular filter element is defined by a first annular coil of a flat wire and the second filter element are each defined by a second annular coil of a flat wire being generally helical in the axial direction. A filter membrane is cylindrically shaped and concentrically disposed between the first and second annular filter element. The filter membrane is porous having aperture size of less than a nanoparticulate size of the solute, but greater than a nanoparticulate size of the solvent. The second annular filter includes adjustable porosity for selectively preventing particles from reaching the filter membrane and selectively cleaning the membrane by reversed flow of solvent through the membrane.

17 Claims, 6 Drawing Sheets

(56) References Cited

U.S. PATENT DOCUMENTS

2016/0024895 A1\* 1/2016 Russell ................ E21B 43/084
   166/230
2018/0172346 A1\* 6/2018 Baxter ................... B01D 29/35

\* cited by examiner

APPARATUS AND METHOD TO EXTRACT PURIFIED WATER FROM SALINE AND OTHER FLUIDS

PRIOR APPLICATIONS

The present application claims priority to U.S. Provisional Patent Application No. 62/785,405 filed on Dec. 27, 2018 and to U.S. Provisional Patent Application No. 62/793,043 filed on Jan. 16, 2019 and to U.S. Provisional Patent Application No. 62/798,723 filed on Jan. 30, 2019.

TECHNICAL FIELD

The present invention relates generally toward a continuous filtration system for separating a solute from a solvent. More specifically, the present invention relates to an apparatus and filtration system for extracting purified water from saline and other contaminated fluids.

BACKGROUND

Economical processes for separating solutes from solvents continues to prove difficult even with advanced filtration technologies. For example, extracting purified water from saline continues to be an expensive and inefficient process. High concentrations of salt disposed in saline is known to cause membrane filtration systems to rapidly become inoperable, because high solute concentrations are osmotically and thermodynamically too stable for the more common reverse osmosis, which fail under high pressure required to reverse osmotic pressure.

As noted, reverse osmosis systems rely primarily on polymeric membranes, where fouling from suspended solids continues to be problematic. Salt content of ocean water averages about 3.5%, brackish water averages about 0.3% and fracking well water, if recycled, saturated at about 24%. At low values, reverse osmosis systems require high amounts of energy to operate and require significant amounts of maintenance to address membrane fouling. Salt content in fracking solutions is known to be considerably higher, rendering the use of reverse osmosis systems, for energetic reasons, nearly non-viable.

Attempts to use nano-technology, otherwise molecular sieve, in the fracking industry has provided new opportunities for filtering brines produced during fracking. Current polymer based systems for extracting the salt and other solutes from water have proven inefficient and expensive. The high concentration of salts and other solutes have rendered nano-technology relatively useless due to required frequent cleaning of filter media, which this automated system overcomes.

By contrast, it would be desirable to provide membrane filtration medias that are stable at high pressures, positive on the retentate side and negative on the permeate to enhance throughput for large scale field operation, an enhanced pervaporation. Therefore, a need exists for an apparatus and process capable of removing salt and other solutes at the nano or molecular level from, as examples, concentrated brines, brackish and ocean water and other contaminants including toxins, by efficient and self-maintaining.

SUMMARY

A filter assembly for removing a solute from a solvent, such as, for example, removing salt from saline or brine is disclosed. A reactor assembly includes a first annular filter element and a second annular filter element. The second annular filter element is concentrically aligned with the first filter element, together defining a common axis. The first annular filter element is defined by a first annular coil of a flat wire that is generally helical in an axial direction and the second filter element is defined by a second annular coil of a flat wire that is also generally helical in the axial direction. A filter membrane having a cylindrical shape is concentrically disposed between the first annular filter element and the second annular filter element. The filter membrane defines a porous structure with an aperture size of less than a nano-particulate size of the solute, but greater than a nano-particulate size of the solvent. The second annular filter includes an adjustable porosity for selectively preventing particles disposed in the solvent capable of fouling the filter membrane from reaching the filter membrane and provides for selectively cleaning the membrane of the solute by reversing flow of solvent through the membrane enabling near continuous flow of solvent through the membrane. These proposed hybrid spiral filter-membrane-filter and system's having self-cleaning mechanism are significantly advantageous, even essential.

The use of membranes consisting of nano-porous media such as zeolite, graphene and thin films of selective adsorbent, hereinafter zeolite, to produce fresh water from brines up to twenty four weight percent has proven elusive until now. This process has been particularly difficult with respect to recovering purified water from fracking processes. Zeolites, which include numerous distinct topologies, provide water permeability and saline exclusion by way of ion entrapment and/or exclusion, while providing threefold increases in water permeability over polyamide based reverse osmosis membranes. The use of a carrier filter provides support, enables self-cleaning and protection of an ultra-thin zeolite nano-porous membrane layer, given that the carrier filter is micro-porous. In addition, the carrier filter is designed to provide enough support to the zeolite membrane layer to allow for negative pressure on a permeate side and positive pressure on an inlet side of the filter pores for enhanced water or solvent velocity and improved solute or salt exclusion and filtration.

Zeolite membranes, and the like used in this invention and present application include porosities of about 0.6 nanometers, which are sufficient to exclude hydrated metal or saline ions while also allowing penetration of water that includes a molecular size of about 0.27 nanometers. It will be correspondingly understood that porosity differences, which allow permeates to transport across the membrane, exclusive of retentate, may be selected for other applications. These may include bio- and industrial waste and toxins, where differences in molecular cross section and membrane aperture may be chosen to discriminate between retentate and permeate as noted above. As set forth in more detail below, the unique concentric filtration and backflush operations overcome salt accumulation known to block pores defined by the zeolite molecular structure. In one embodiment, octahedral zeolite or graphene structures have proven beneficial for saline exclusion without preventing flow of water through the filter membrane. It will be understood further by illustration that these two medias may be used together or in combination with selective adsorbents. The filtration assembly of the present invention also provides for recycling salt or other retentates extracted from water that may be used, for example in road deicing or provide other industrial benefits. Still further, the filtration assembly also provides useful salt extraction from ocean water at a low cost to provide potable water to coastal regions when adapted for large scale use;

this extraction may also include newly recognized toxins such as polyfluoroalkyl substances (PFAS) from natural waters. In this latter application example, a this film of adsorbent media such as polycalcium phosphate with affinities in the parts per trillion, placed adjacent the size selecting membrane, will entrap the trace but toxic agent, while enabling transport of water and such innocuous fluids. The membrane may be thus used to cut the fluid into innocuous and nocuous components.

BRIEF DESCRIPTION OF THE FIGURES

Other advantages of the present invention will be readily appreciated, as the same becomes better understood by reference to the following detailed description when considered in connection with the accompanying drawings, wherein.

DETAILED DESCRIPTION

Figure 1:
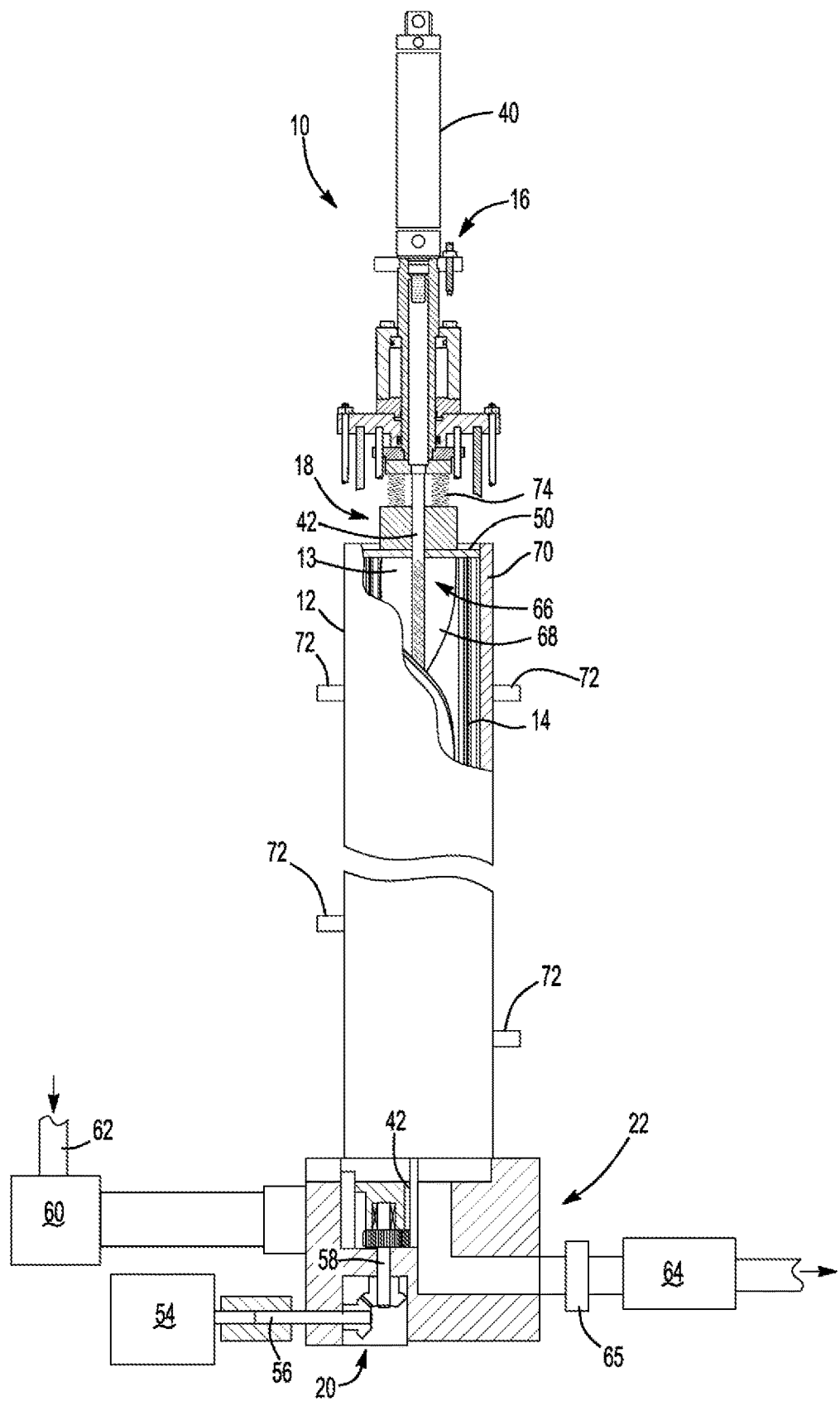
FIG. 1 shows a side schematic view of the filter assembly of the present invention.

Referring to FIG. 1, a side view of a first embodiment of a filter assembly of the present invention is generally shown at 10. A housing 12 encloses a variable aperture filter apparatus 14, the function of which will become more evident herein below. An aperture drive mechanism 16 is disposed upon a first end 18 of the filter assembly 10 and a solute/solvent control assembly 20 is disposed upon a second end 22 of the filter assembly 10.

Figure 2:
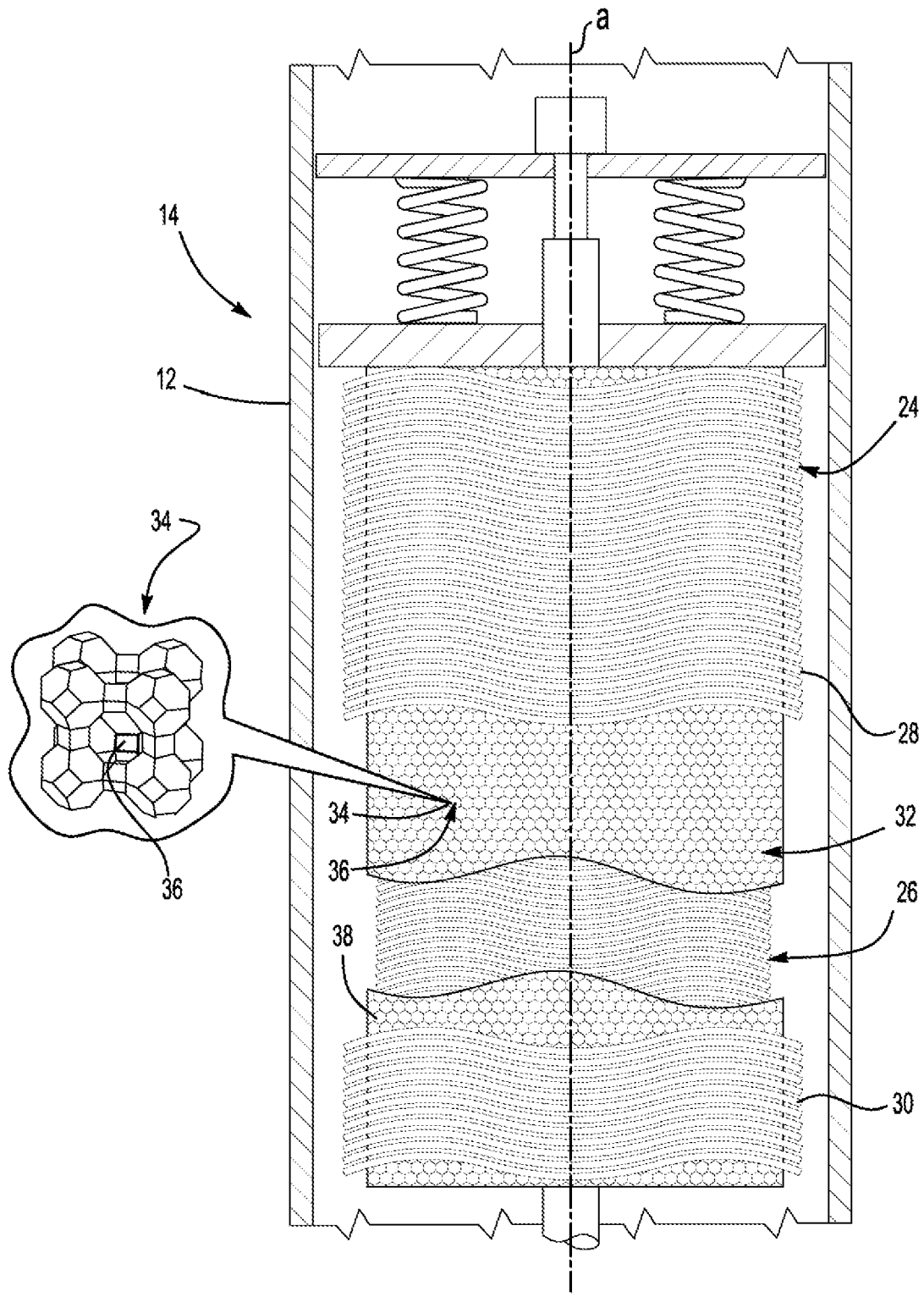
FIG. 2 shows a partial view of the first and second annular filter elements concentrically enclosing the filter membrane.

Referring now to FIG. 2, wherein a schematic of the filter apparatus 14 is shown including a first annular filter element 24 and a second annular filter element 26 that defines an inner housing chamber 13 (FIG. 1). The first annular filter element 24 is disposed radially outwardly of the second annular filter element 26. The first annular filter element 24 is formed from a first annular coil 28 of flat wire being generally helical in an axial direction and the second annular filter element is formed from a second annular coil 30 of flat wire that is also generally helical in the axial direction. Because the second annular filter element 26 is received concentrically inwardly of the first annular filter element 24, a diameter of the second annular filter element 26 is less than a diameter of the first annular filter element 24. The configuration of the first annular filter element 24 and the second annular filter element 26 are both substantially the same as the wave coil disclosed in U.S. Pat. No. 6,761,270 WAVE COIL FILTER ASSEMBLY, and U.S. Pat. No. 7,122,123 METHOD OF FILTERING A FLUID WITH A FILTER ASSEMBLY the contents both of which are included herein by reference. Therefore, it should be understood by those of skill in the art that a size of apertures disposed between sequential coils (porosity) of the flat wire are adjustable by way of adjusting compression on the annular filter elements, the purpose of which will be described further herein below.

Each of the first annular coil 28 and the second annular coil 30 are formed from a single helical coil of flat wire stock providing adjacent coil gaps of between 2 microns and 20 microns when closed for filtration and about 100 microns when open for backwash and cleaning. Crimped spring steel from sources such as, for example IndiaMART and Smalley Steel suffice depending on price point. In one embodiment, Smalley Steel may provide 12 three inch height stacked segments by ten to twelve inch diameter segments. Segmented assembly may be of particular use due to the formation of a filter membrane 32 that is embedded between the first annular filter element 24 and the second annular filter element 26. Such annular wave spring segments may be capped with flat retainer rings, such that the first and second filter elements may be more readily assembled with the enclosed zeolite and/or graphene membranes as subunits units of the 12 noted in this embodiment.

Figure 5:
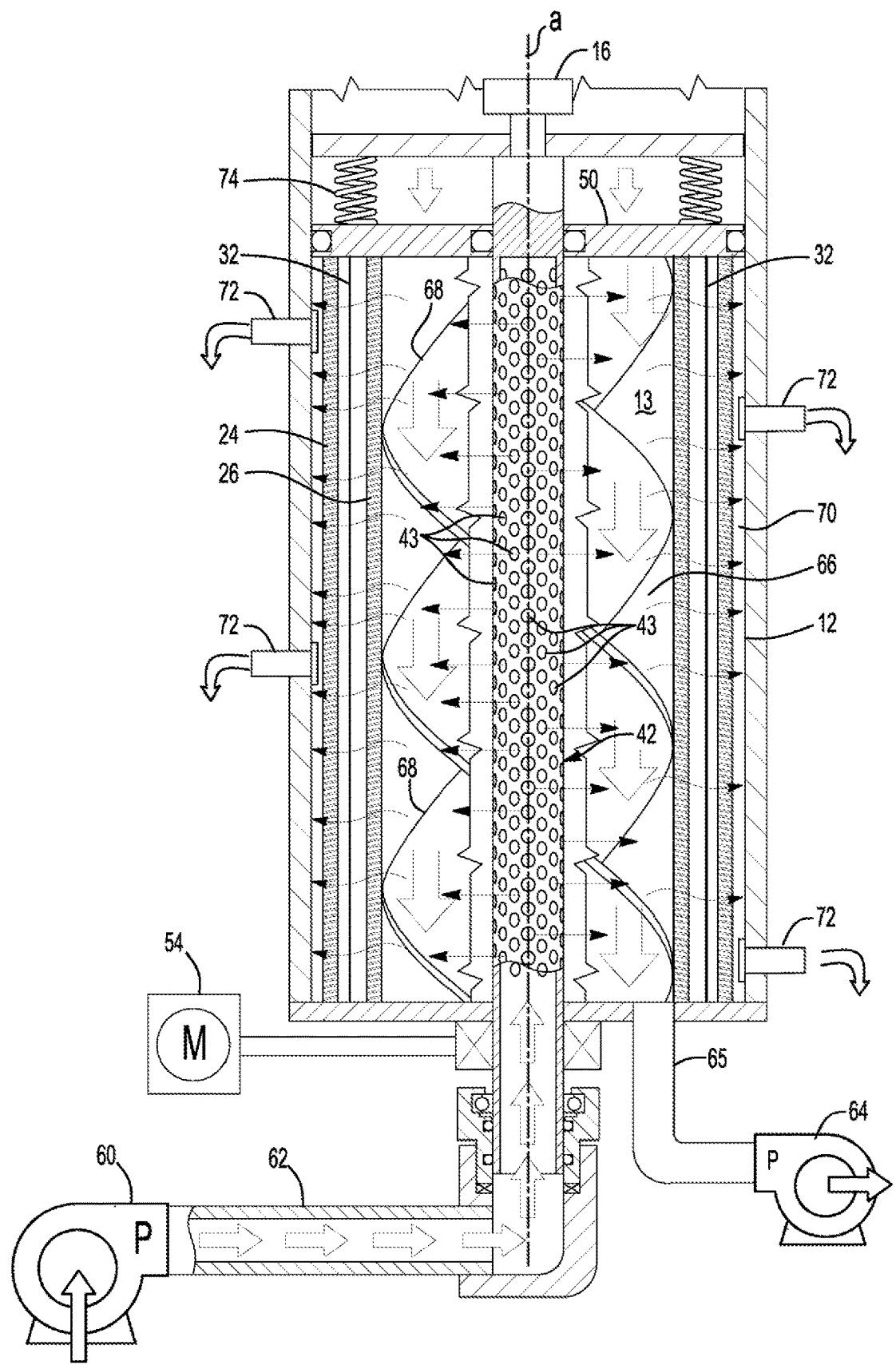
FIG. 5 shows a schematic view of the assembly of the present invention with saline filtration flow direction.

In another embodiment of the Inventor's disclosed wave coil, as in the United States Patents referenced above, the nano-apertures may be generated between the coil's opposed flat surfaces. When the wave coils' apertures are reduced to zero by compression, the flat opposing surfaces may be pre-formed to contain laser etched nano-pore grooves. These would have widths at least 0.050 microns and densities of 100 grooves per millimeter, radially disposed on the surfaces of the filters' flat wire. The purpose of such mesoporous grooved surface in the first 24 annular elements is to channel fine bacterial, algal and humic slimes as may penetrate the incompletely closed apertures of this spiral wave filter 24. Adapting to saline or brackish or bio-waste fluids can be challenging, given that such complex fluids may require filtration layering. Under high pressures the disorganized slimes will aggregate or condense into molecular level sheets, external to the membrane enclosed between the first 24 and second 26 filter elements. Physical chemistry confirms the formation of such condensed sheets, which will flow parallel to the membrane 32; during backwash, these sheets are broken up into fibrils, passing in reverse direction back through the mesoporous containing filter 24 into the discharge wash (FIG. 5, 65).

The filter membrane 32 includes a tubular shape and is disposed between the first annular filter element 24 and the second annular filter element 26 so that the first annular filter element is disposed radially outwardly of the filter membrane 32 and the second annular filter element 30 is disposed radially inwardly of the filter membrane 32 presenting concentric alignment in the axial direction so that a common axis is defined. The filter membrane 32 is formed to define molecular sized membrane pores 36 for entrapping solute while allowing a solvent in which the solute is entrapped to pass through. In one embodiment, the filter membrane 32 is formed from zeolite 34, which is deposited on a carrier membrane 38. The zeolite includes zeolite pores 36 having porosities generally less than 5 nanometers are formed in a slurry, where such media is laser 3D printed on the surface of the carrier filter as membrane 32 on the surface of carrier membrane 38. The carrier membrane 36 in some applications has a thickness in the order of 0.1 to 0.5 microns, where the membrane's 36 maximum thickness ideally will be kept to no greater than 0.05 microns. At such thicknesses, the zeolite slurry is 3D printed and laser sintered circumferentially and radially to form the filter membrane 32. When enclosed within the first 24 and second filter 26 elements the formed membrane, will resist differential fluid pressures external to the membrane and vacuum externally during filtration. The membrane 32, thus supported between the first annular filter element 24 and the second annular filter element 26 enables maximum water transport with sufficient stability, even as a monolayer.

Figure 3:
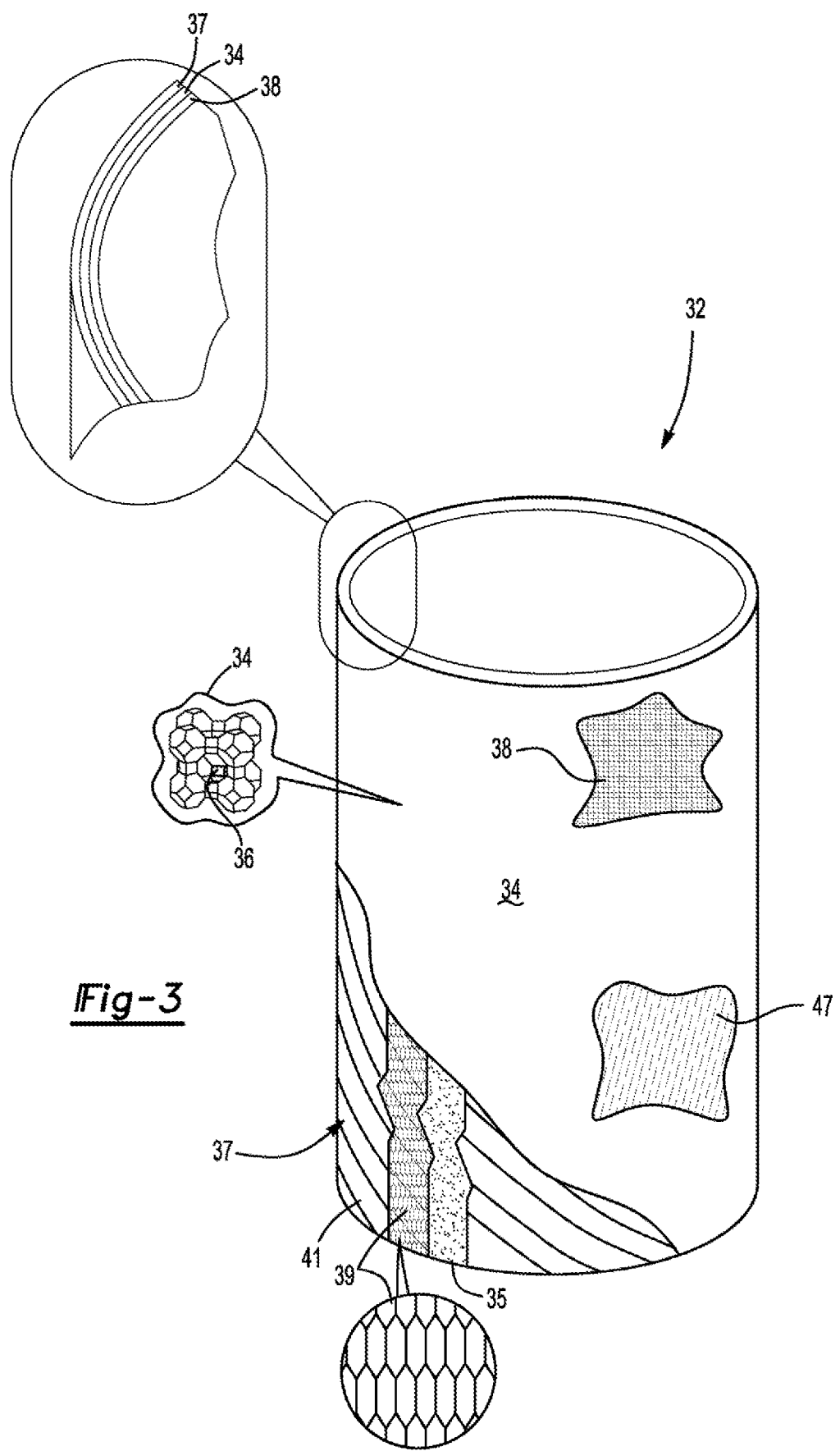
FIG. 3 shows a partial cut out perspective view of the filter membrane of the present invention including alternative embodiments.

In another embodiment, and as best seen in FIG. 3, the carrier membrane 38 may also be cladded with a graphene membrane 39, shown as oxidized or reduced octagonal sheets or strips of carbon. This is often illustrated as a microporous substrate roll or ribbon 37, e.g., copper foil 35 (bottom, dark layer), upon which to vapor deposit graphene 39 (middle layer) and coated with a porous plastic 41 (top layer). In another similar format, the tri-layer tape or ribbon 37 includes two ribbons overlying a carrier cylinder, as the carrier filter 26 equivalent. Massachusetts Institute of Technology has recently perfected means to commercially generate ribbons or rolls of this nano-porous graphene. That octahedral graphene structure, as illustrated at 37 of FIG. 3, is thus commercially available using furnace and such devices, described as bundled in a tri-sheet roll, as represented in FIG. 3 at in 37 and 39. The ribbon 37 may also be laid over an outer surface of the second annular filter element 26 to form and define the filter membrane 32. Therefore, the filter membrane 32 is adhered to the second annular filter element 26 while still being disposed between the first annular filter element 26 and the second annular filter element 24. In this embodiment, the copper foil 35 may be removed and the filter membrane 32 is defined by the porous plastic 41 and the zeolite/graphene hybrid 39. This arrangement provides unique mechanical support to the membrane 32. Further, this arrangement provides differential and sequential separation of solubles from fluids when molecular size and weight vary. It should be understood that the membrane 32 porosities may be synthesized with different affinities and porosities, thus providing multicomponent separation.

By comparison, the zeolite 34, provides synthetic porosities, generally on the order of 0.5 nanometers, which, as a slurry, can be 3D printed and laser fused in a single sheet or single thin film sheet on the surface of the carrier membrane 38. In addition to zeolite 34 and graphene 39, there are other hybrid combinations as in 40, 41, where zeolite 3D laser printing may be needed 41 to bind together ribbons or sheets of graphene to form larger surface areas, depending on the solvent throughput required. Zeolite and graphene can be selected for comparable porosities and surface chemistries. Both zeolite and graphene media transport similarly through micro-channels networking between surface porosities. Other membrane-filter media are within the scope of this invention including acrylamide, organometallic molecular sieve agents, equivalents, and combinations as may be or become available. The space interior to the two annular filters 28 and 30 may not only include membranes formed from zeolite 34 and graphene 39 and the like, but also be packed with, for example, bone char. The contemplated compound is poly-calcium phosphate, which has a strong affinity for a recently recognized toxin, polyfluoroalkyl chemicals, where the affinity constants are reportedly in the $10^{32}$ range, as in lower parts per trillion. Federal EPA standards are to require natural waters not to exceed 70 parts per trillion, with some States setting the limit as low as 6 ppt, making these alternative affinity embodiments particularly attractive. In order to sequester these trace quantities, a layered combination of the nano-porous membranes described above and agents, such as hydroxyapatite 42, would be required to isolate quantities for analysis and remediation. Transport rate of solvent, i.e. water across the filter membrane 32 is believed to be inversely proportional to membrane thicknesses and porosity of the graphene, zeolite and adsorbent constituents. Spray or dipping application of zeolite 34 slurry onto the carrier membrane 38, will form a film having an estimated 5 nanometers in thickness, preferably 0.5 as a monolayer. The 5 nanometer thickness is sufficient for desirable filtration rates, being orders of magnitude better than reverse osmosis membranes. As set forth above, desirable porosity ranges for the zeolite 34 and/or graphene 40 should be between about 0.3 and 0.5 for optimal throughput.

In order to maintain membrane integrity under pressure and at optimal thickness, it is essential that both inner and outer annular filter elements 24, 26 leave as little spacing as possible to tightly contain the membrane 32 or bulk adsorbents 34, 39, 42 to withstand rigorous filtration pressures. It is understood that the filter membrane 32 is also supported by its location between the first annular filter element 24 and the second annular filter element 26. While the Figures show radial or concentric space between the first annular filter element 24, the filter membrane 32 and the second annular filter element 26, the radial spacing is only on an order of microns enabling the annular filter elements 24, 26 to properly support the filter membrane 32 during both saline filtration and cleaning cycles by way of backwashing. During assembly, the first annular filter element 24 is twisted counter clockwise, or in reverse of the direction of the first annular coil 28 to increase the inner diameter of the first annular filter element 24 by several microns. The increased inner diameter of the first annular filter element 24 provides the space to insert both the filter membrane 32 and the second annular filter element 26, disposed internally of the first filter element 24. After insertion, the reverse twist of the first annular coil 28 is released providing a singular ionic reactor element formed from the first annular filter element 24, the filter membrane 32 and the second annular filter element 26. As noted earlier, should the three element filter-membrane include one exterior laser etched element for select environmental purposes, amorphous slime may be separately isolated with the solute.

By way of operational example, a filter membrane 32 having a radius of about five inches and an axial length of about 36 inches provides a throughput increase of about twenty five fold over a multilayer membrane of the type used in a reverse osmosis system. As such, a single assembly 10 having these dimensions would more than satisfy operational requirements of, for example, desalination at an oil field fracking site. Such filtration enhancements are achieved by applying thin films to the annular coils 28, 30 as will be explained further herein below.

Zeolites slurries with binding agents have been developed to form the saline filtration membrane 38. As noted above, such slurries may also be used to provide a thin coating to the inner side of the second annular filter element 26, with multilayered thicknesses between 5 and 10 nanometers, but preferably 0.5 nanometers as monomolecular film. The second annular filter element 26, protects the filter membrane 32 from being blocked by sediment and is self-cleaning by way of backwash to clear filter membrane 32 of any accumulated sediment and provides the means to insure continuous operation. Desalinating zeolite membrane structures was anticipated recently by Sayed H. Jamnali, et al., j. Physical Chemistry, 2017 and Z. In Cao, et al., Science Advances, 2018, in this publication describes nano-sheets prepared by a dip method on macro-porous alumina substrate, with a laminated thickness of from 100 to 500 nanometers, where the permeability to water and salt rejection varies inversely with thickness, and pressure difference across the membrane. The optimal thickness and support structures described herein are made possible by the unique properties of the spiral filtration elements. These elements, together with other adsorptive and/or laser etched spiral annular components, provide options as may be needed for management of waste fluids.

Figure 4:
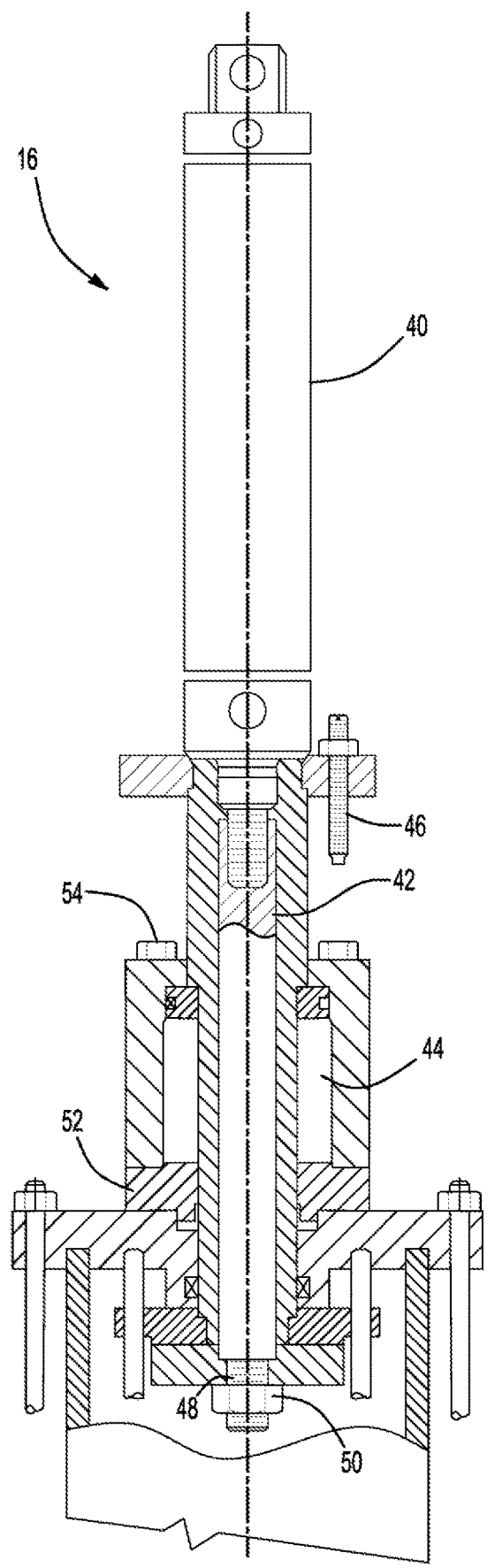
FIG. 4 shows a side view of a drive mechanism used for adjusting porosity of first and second annular filter elements.

As set forth above, the first annular filter element 24 and the second annular filter element 26 provides variable porosity by way of the aperture drive mechanism 16 best seen in FIGS. 1 and 4. The drive mechanism 16 includes a motor 40 for providing torque to an aperture drive shaft 42. In one embodiment the motor 40 is pneumatic, multi-vane or air driven by pressurized fluid or air. In another embodiment, the motor 40 is an electrically driven servomotor. With respect to the pneumatically driven motor 40, a high gear reduction on the order of 44:1 provides optimal toque. A thru-hole cylinder 44 interacts with adjustable stops 46 to provide microfiltration levels to the first annular coil 28 and the second annular coil 30 of about 20 microns during a filtering stage and about 100 microns during a backwash stage. In one embodiment an acme screw 48 extends at the end of the annular drive shaft 42 and receives a piston 50, which is retained by an acme nut 50, or equivalent. The motor 40 actuates the piston 50 for translating adjustment of the porosity of the annular coils 28, 30. In addition, the thru-hole cylinder 44 provides a drive shaft seal 52 and a quick release screw 54 for easily removing the aperture drive mechanism 16 from the housing 12.

Referring again to FIG. 1, the control assembly 20 is located at the second end 22 of the housing 12. A drive element 54 provides rotary movement to a first drive gear 56. The drive element 54 is either a servomotor, a pneumatic motor, or equivalents capable of providing rotary movement to the first drive gear 56. The first drive gear 56 transfers rotary movement to a second drive gear 58. The second drive gear 58 in turn provides rotation to the annular drive shaft 42. A fluid pump 60 delivers fluid with solute (hereinafter saline) to the annular drive shaft 42 that is received through a saline inlet 62. The saline exits the annular drive shaft 42 through shaft apertures 43. The saline fluid pump 60, in one embodiment is a two way pump capable of providing backpressure on the annular drive shaft 42 by reversing pumping direction. Further, pressurized air or other auxiliary chemicals and agents, including solvents, steam and solubilizing compositions may be delivered through the annular drive shaft to the inner housing chamber 13 by way of shaft apertures 43. Alternative saline delivery pump configurations are within the scope of this invention including a combination of two pumps and cooperative valves used to reverse the flow of saline from the housing 12. The control assembly 20 also includes a solute extractor 64 for removing solute from the housing 12 under pressure. A gate valve 65 provides optional selective extraction of the solute through the solute extractor 64 on predetermined intervals.

The solute is likely a viscous sludge requiring a high amount of extraction pressure. Therefore, the solute extractor 64, in one embodiment is a pump that works in combination with a conveyor 66 that includes helical fins 68 that are affixed to the annular drive shaft 42. Therefore, the helical fins 68 are provided rotary movement from the drive element 54 for conveying solute toward the solute extractor 64. In one exemplary embodiment, the conveyor 66 includes a travel radius of about three inches and having a length of about 36 inches. A conveyor 66 having these dimensions would be run at a rate of about 30 rotations per minute. Further, the helical fins 68 include a generally uniform diameter, which is believed to prevent accumulation of salts or other solutes from concentrating irregularly upon the filter membrane 32. Rapid consistent movement of the saline over the membranes 32 internal surface provided by the conveyor 66 fins 68 is thus achieved. However, in some applications it is desirable that the helical fines 68 are not of uniform diameter, but are frustoconical angled at about 10 degrees, decreasing in diameter in a direction toward the second end 22 of the assembly 10.

Referring now to FIG. 4, the process by which solute is separated from a solvent will now be explained by way of a schematic representation. It should be understood that the process described herein is merely exemplary. The details associated with desalination of fracking fluids are for ease of understanding to one of ordinary skill in the art. It should be understood that the invention of the present application may be used to separate other solutes from solvents, including, but not limited to desalination of ocean water, contaminated bio- and industrial fluids.

In the fracking fluids example used, saline solution up to 24% by weight salt is introduced to the assembly 10 through the saline inlet 62. The saline solution is pressurized by the saline fluid pump 60 to about 100 psi. The saline solution is transferred under pressure to an inside of the annular drive shaft 42 from which it exits through shaft apertures 43 into an inner housing chamber 13. The drive element 54 transfers pivotal movement to the annular drive shaft 42 around axis a of the assembly 10.

The helical fins 68 that are attached to the annular drive shaft 42 convey centrifugal force to the saline solution disposed in the inner housing chamber 13 when the annular drive shaft pivots around axis a forcing the saline solution radially outwardly of the housing 12. Should the annular drive be frustoconical in shape, there will be a centrifugal force also conveyed parallel to the drive, from entrance to exit end, to facilitate direction of flow within the cylinder 70. Further, turbulent movement of the saline generated by rotation of the helical fins 68 prevents the filter membrane 32 from being blocked by sediment, precipitating solute or viscous supersaturated solute, thus providing for continuous operation of the assembly other than during self-cleaning backwash cycles. During the introduction of saline to the assembly 10 and while the annular drive shaft 42 is providing centrifugal force to the saline disposed in the inner housing chamber 13, the aperture drive mechanism 16 causes the piston 50 to compress the first and second annular filter elements 24, 26 thereby reducing the spacing between adjacent coils of the first annular coil 28 and the second annular coil 26 respectively. Reduced spacing provides filtration apertures of about 20 microns or less for filtering larger contamination disposed in the saline while allowing the solute, in this example, salt to pass through the second annular filter element 26, which is disposed radially inwardly of both the filter membrane 32 and the first annular element 24.

After passing through the second annular filter element 24 through the centrifugal force generated by the spinning helical fins 68, the saline contacts the filter membrane 32 that is concentrically disposed between the first annular filter element 24 and the second annular filter element 26. Particulate matter having a diameter greater than about 20 microns does not reach the filter membrane 32 due to being entrapped by the second filter element 24. As explained in detail above, the zeolite 34 or graphene 39 or graphene-zeolite hybrid 41 or adsorbent 47 (FIG. 3) upon being applied as thin film, shown as zeolite (or alternate media noted) membrane 32 (FIG. 3) provides filtration, providing porosities, optimally less than about 0.5 nanometers, which is capable of capturing salt solute while allowing the water or solvent to pass through. As would be anticipated by one of ordinary skill in the art, the solute collects on the inner surface of the zeolite (or other such media noted) membrane 32 allowing clean solvent (water) to pass through the membrane 32 radially outwardly through the first annular filter element 24 into the clean solvent chamber 70.

Figure 6:
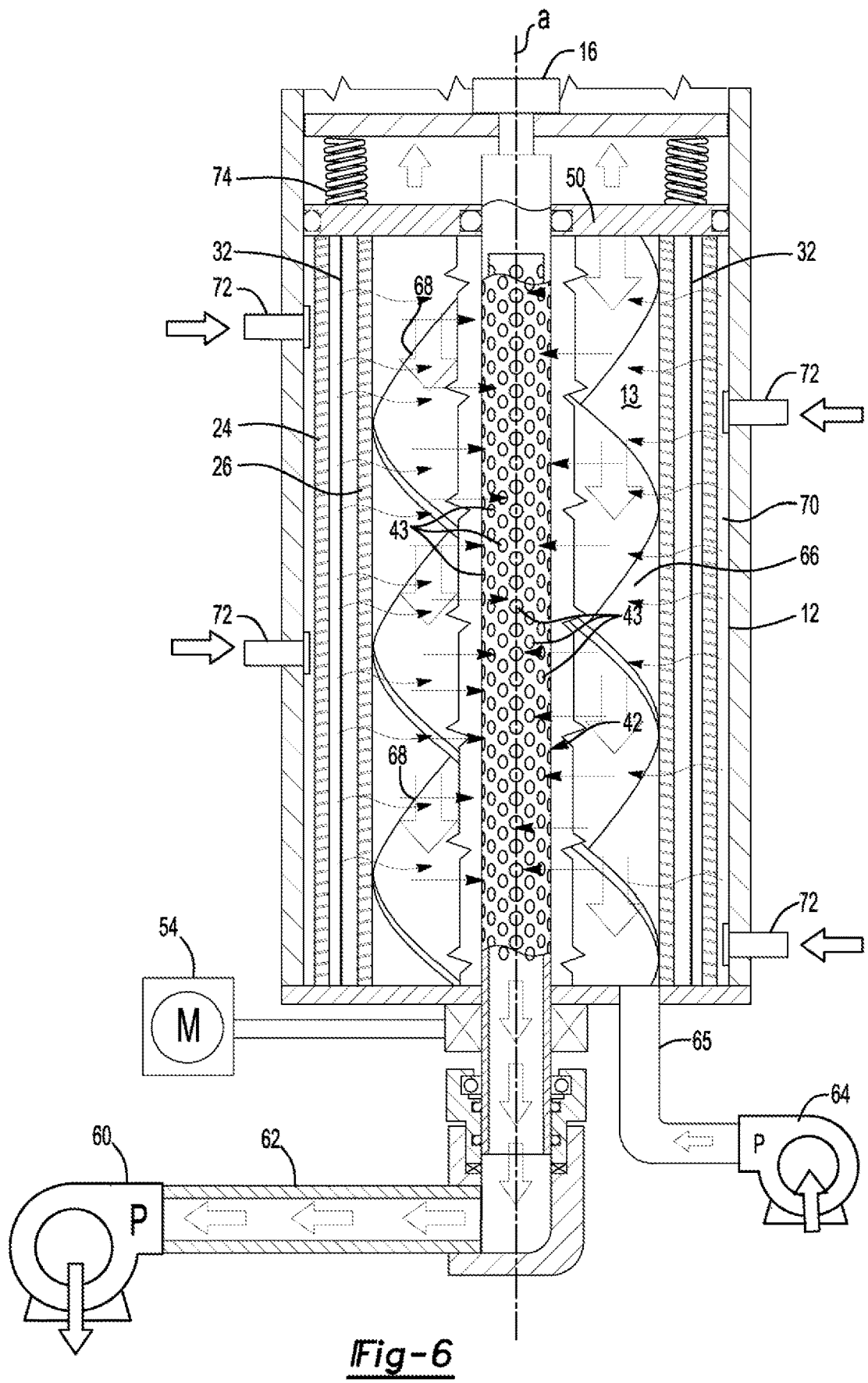
FIG. 6 shows a schematic view of the assembly representing backflush flow direction.

Solvent is removed from the clean solvent chamber 70 through solvent outlet 72. In the present example, clean fresh, useable water is extracted through the solvent outlet 72 that is not hazardous and can be easily disposed of or recycled without requiring additional treatment, remediation, or storage. When necessary, a vacuum or negative pressure is created by way of a pump (not shown) to draw the solvent out of the solvent chamber though the solvent outlet 72. It is contemplated by the inventor that vacuum or negative pressure of about 0.014 psi will suffice. FIGS. 5 and 6 shows multiple solvent outlets 72 spaced along the housing 12. However, it should be understood that a single outlet 72 may also suffice for the purpose of extracting the solvent.

A desirable external pressure at the solvent inlet 62, where brine or contaminated water is introduced adjacent the to the filter-membrane complex 32, ranges between about 120 psi to about 150 psi. A desirable temperature at this pressure range is greater than about 120° F. Adhesive components and other byproducts are often produced in fracking operations in addition to up to 24% salinity, for which the laser etched external element 24 may be inserted for protection against fowling. Although these adhesives and byproducts may be removed separately by automatic backwashing, as directed by a controller, such backwash will remove buildup of adhesives or any other byproducts from the second annular filter element 26 providing the ability for continuous processing of fracking saline.

During extended operation, solute begins to collect in the inner housing chamber 13 and can substantially increase the weight percent of the solute in the solvent disposed in the inner housing chamber 13. Therefore, the conveyor 66, while also creating centrifugal force to drive the solution radially outwardly and longitudinally, conveys the extracted solute downwardly in the inner housing chamber where the filtered solute is removed from the inner housing chamber 13 though the solute extractor 65. At this location, the solute is believed to include sludge-like consistency due to the high concentration of the filtered solute in the solvent. Should the viscosity exceed a level that disadvantages extraction of the solute from the inner chamber, an extraction pump at 64 could provide negative pressure to the solute's exit 65, thereby facilitating removal of the filtered solute. Furthermore, the water content of the filter solute extracted through the solute extractor is controllable, depending upon whether there is a desired use for the solute. Higher pressures or temperatures may be maintained in the assembly 10 causing evaporation of solvent contained in the solute. Further, the assembly 10 may be arranged in series to provide additional drying at even higher differential pressures and temperatures. Enhanced dewatering of the solute or filtrate is achieved under increased pressure on the order of about 125 psi by introducing pressurized air through the annular drive shaft 42, as noted in FIG. 1. The combination of pneumatic drying and pressure from the piston 50 and biasing element 74 are capable of sufficiently drying the solute, and in the case of the solute being salt, provide a useable byproduct.

As set forth above, the solute collects on an inner surface of the filter membrane 32. When fluid pressure on the membrane 32 exceeds a predetermined limit, or at scheduled cycle times during extended operation, a controller (not shown), that is integrated with the assembly, initiates a backflush operation to reverse the flow of purified solvent through the first annular filter element 24, the filter membrane 32, and subsequently through the second annular filter element 26 to remove buildup of solute, in this example salt, on, at least, the filter membrane 32 and the first annular filter element 24. The reverse flow process of the backflush operation is represented in FIG. 6.

During the backflush operations, the saline fluid pump 60 reverses direction to draw saline from the inner housing chamber 13. In addition, pressure is released on the first annular filter element 24 and the second annular filter element 26 to increase porosity from about 20 microns used for filtration to about 100 microns used for the backflush operation. A biasing element 74 maintains a desirable biasing force on the first annular filter element 24 and the second annular filter element 26 to maintain porosity in the 100 micron range during backflush operations. The piston 50 compresses the biasing element 74 during filtration and release the compression of the biasing element 74 while the assembly 10 is being backwashed. In addition, negative pressure is no longer maintained on the solvent outlet 72 during backflush operations so that the solvent may flow freely in the reverse direction through the filter membrane 32 by an amount believed to remove a buildup of solute on the filter membrane 32 and other larger contaminants entrapped by the second annular filter element 26.

The invention has been described is in an illustrative manner; many modifications and variations of the present invention are possible, including removal of toxins from fluids, in light of the above teachings. It is therefore to be understood that within the specification, the reference numerals are merely for convenience, and are not to be in any way limiting, and that the invention may be practiced otherwise than is specifically described. Therefore, the invention can be practiced otherwise than is specifically described within the scope of the stated claims following this first disclosed embodiment.

What is claimed is:

1. A filter assembly for removing a solute from a solvent, comprising:
   a reactor assembly including a first annular filter element and a second annular filter element, said second annular filter element being disposed radially inwardly and concentrically aligned with the first filter element together defining a common axis;
   said first annular filter element being defined by a first annular coil of a flat wire being generally helical in an axial direction and said second filter element being defined by a second annular coil of a flat wire being generally helical in the axial direction;
   a filter membrane having a cylindrical shape and being concentrically disposed between said first annular filter element and said second annular filter element; said filter membrane defining a porous structure with an aperture size of less than a nano-particulate size of the solute, but greater than a nano-particulate size of the solvent; and
   said second annular filter including an adjustable porosity for selectively preventing particles disposed in the solvent capable of fouling the filter membrane from reaching the filter membrane and selectively cleaning said membrane of the solute by reversing flow of solvent through said membrane thereby providing for continuous flow of solvent through said membrane.

2. The filter assembly set forth in claim 1, wherein said second annular filter defines a solute chamber disposed concentrically inwardly thereof in which solute laden solvent is presented and filtered solute is collected.

3. The filter assembly set forth in claim 1, further including a conveyor disposed within said solute chamber for removing filtered solute from said solute chamber.

4. The filter assembly set forth in claim 3, wherein said conveyor includes a helical fin disposed upon a shaft being rotatable around said common axis thereby forcing filtered solute toward a vacuum pump thereby extracting the filtered solute from the filter assembly.

5. The assembly set forth in claim 1, wherein said first annular filter defines a clean solute chamber with an assembly housing into which clean solute passes radially outwardly through said first annular filter.

6. The assembly set forth in claim 4, wherein a shaft of said conveyor is hollow and defined by a porous tubular wall for providing pressurized and heated fluid to said solute chamber for maintaining a predetermined pressure and fluid within said solute chamber.

7. The assembly set forth in claim 4, wherein said helical fin is configured for drawing solute radially inwardly away from said second annular filter thereby preventing solute from fouling said second annular filter.

8. The assembly set forth in claim 1, wherein said filter membrane is formed from one of a plurality filter medias, including zeolite, having porosities less than about a size of nano-particles disposed in the solute and greater than molecular size of the solvent.

9. The assembly set forth in claim 1, wherein said filter membrane is formed from zeolite or graphene or a combination of both including a porosity less than about 0.6 nanometers.

10. The assembly set forth in claim 1, wherein said filter membrane is formed from zeolite including a porosity of between about 0.3 and 0.5 nanometers.

11. The assembly set forth in claim 1, wherein said filter membrane is formed from an organometallic molecular sieve agent including acrylamide and graphene, and combinations thereof.

12. The assembly set forth in claim 1, wherein said filter membrane includes self-cleaning adsorbent other than those forming membrane structures.

13. The assembly set forth in claim 1, wherein said filter membrane is formed from at least one of zeolite, graphene, equivalent adsorbents, and combinations thereof.

14. The assembly set forth in claim 1, wherein said filter membrane includes a carrier membrane-comprising zeolite bonded to a ribbon comprising graphene providing a plurality of differing porosity.

15. The assembly set forth in claim 14, wherein said ribbon includes a porous polymeric coating disposed over said graphene.

16. The assembly set forth in claim 14, wherein said carrier membrane includes a plurality of layers extending radially outwardly comprising different porosities.

17. The assembly set forth in claim 1, wherein said zeolite comprises a binder with adjacent adsorbents.

* * * * *